US011286965B2

(12) United States Patent
Landberg et al.

(10) Patent No.: US 11,286,965 B2
(45) Date of Patent: Mar. 29, 2022

(54) FLUID ACTUATOR ARRANGEMENT AND A METHOD FOR CONTROL OF A FLUID ACTUATOR ARRANGEMENT

(71) Applicant: SAAB AB, Linköping (SE)

(72) Inventors: Magnus Landberg, Linköping (SE); Martin Hochwallner, Linköping (SE)

(73) Assignee: SAAB AB, Linköping (SE)

( * ) Notice: Subject to any disclaimer, the term of this patent is extended or adjusted under 35 U.S.C. 154(b) by 68 days.

(21) Appl. No.: 16/302,901

(22) PCT Filed: May 19, 2016

(86) PCT No.: PCT/SE2016/050457
§ 371 (c)(1),
(2) Date: Nov. 19, 2018

(87) PCT Pub. No.: WO2017/200440
PCT Pub. Date: Nov. 23, 2017

(65) Prior Publication Data
US 2019/0203741 A1 Jul. 4, 2019

(51) Int. Cl.
*F15B 15/14* (2006.01)
*F15B 11/18* (2006.01)
(Continued)

(52) U.S. Cl.
CPC .......... *F15B 15/148* (2013.01); *F15B 11/183* (2013.01); *F15B 11/22* (2013.01);
(Continued)

(58) Field of Classification Search
CPC ........ F15B 11/183; F15B 11/22; F15B 15/28; F15B 15/2838
See application file for complete search history.

(56) References Cited

U.S. PATENT DOCUMENTS 3,220,317 A 11/1965 Fuell
4,018,071 A 4/1977 Lampietti
(Continued)

FOREIGN PATENT DOCUMENTS

CN 101166906 A 4/2008
CN 101688545 A 3/2010
(Continued)

OTHER PUBLICATIONS

International Search Report with Written Opinion dated Jan. 26, 2017 in corresponding international application No. PCT/SE2016/050457 (14 pages).

(Continued)

*Primary Examiner* — Kenneth Bomberg
*Assistant Examiner* — Matthew Wiblin
(74) *Attorney, Agent, or Firm* — Sage Patent Group

(57) ABSTRACT

A fluid actuator arrangement comprises a piston rod member, at least two cylinders each said cylinder having a piston body, and a clamping mechanism associated to each cylinder. Each clamping mechanism is arranged to engage and disengage the piston body of the cylinder to the piston rod member. The fluid actuator arrangement comprises further a control element arranged to control a back and forward movement of the respective piston body so that forward movement is slower than the backward movement and to control the movement of the respective piston bodies in relation to each other such that at least one piston body is always moving forward and such that an overlap exists wherein at least two of the piston bodies are moving forward simultaneously during a cycle.

31 Claims, 6 Drawing Sheets

(51) Int. Cl.

| | |
|---|---|
| ***F15B 15/26*** | (2006.01) |
| ***F15B 15/28*** | (2006.01) |
| ***F15B 11/22*** | (2006.01) |

(52) U.S. Cl.

CPC ............ *F15B 15/262* (2013.01); *F15B 15/28* (2013.01); *F15B 15/2838* (2013.01); *F15B 2015/268* (2013.01)

(56) References Cited

U.S. PATENT DOCUMENTS

| | | | | | |
|---|---|---|---|---|---|
| 4,185,539 | A | | 1/1980 | Stratienko | |
| 4,506,867 | A | | 3/1985 | LeGlue | |
| 4,526,086 | A | | 7/1985 | Holton et al. | |
| 4,535,971 | A | | 8/1985 | Laplante | |
| 4,689,553 | A | * | 8/1987 | Haddox | F15B 15/28 324/635 |
| 4,817,783 | A | * | 4/1989 | Foster | B65G 25/065 198/750.5 |
| 4,915,281 | A | * | 4/1990 | Berger | B66D 3/006 198/468.2 |
| 5,361,680 | A | * | 11/1994 | Matsui | F15B 11/0365 91/519 |
| 7,108,108 | B1 | | 9/2006 | Heinzeroth | |
| 7,594,565 | B1 | * | 9/2009 | Adams, Jr. | F16D 49/14 188/170 |
| 9,995,320 | B2 | * | 6/2018 | Landberg | F15B 15/02 |
| 2013/0277584 | A1 | * | 10/2013 | McKernan | F15B 11/22 251/129.01 |

FOREIGN PATENT DOCUMENTS

| | | | |
|---|---|---|---|
| CN | 201671910 | U | 12/2010 |
| DE | 2649958 | A1 | 5/1978 |
| DE | 3642695 | A1 | 6/1988 |
| DE | 4413165 | A1 | 10/1995 |
| EP | 67719 | A1 | 12/1982 |
| EP | 0397270 | A1 | 11/1990 |
| GB | 1309232 | A | 3/1973 |
| SU | 993677 | A1 | 12/1983 |
| WO | 2015195029 | A1 | 12/2015 |

OTHER PUBLICATIONS

International Preliminary Report on Patentability dated Sep. 13, 2018 in corresponding international application No. PCT/SE2016/050457 (23 pages).

Chinese Office Action and Serach Report in corresponding Chinese Application No. 201680085889.5 dated Dec. 30, 2019 (33 pages).

Extended European Search Report in corresponding European Application No. 16902557.4 dated Jan. 20, 2020 (11 pages).

* cited by examiner

FLUID ACTUATOR ARRANGEMENT AND A METHOD FOR CONTROL OF A FLUID ACTUATOR ARRANGEMENT

CROSS-REFERENCE TO RELATED APPLICATIONS

This application is a U.S. National Stage application of PCT/SE/2016/050457, filed May 19, 2016 and published on Nov. 23, 2017 as WO/2017/200440, the contents of which are hereby incorporated by reference in their entireties.

TECHNICAL FIELD

The present invention relates to a fluid actuator arrangement.

The present invention concerns the industry using hydraulic and/or pneumatic actuators for different types of applications and also concerns the manufacture industry producing such arrangements.

BACKGROUND

There is a desire to provide an elongated fluid actuator arrangement that reliably could distribute proper control functionality regarding force and motion rate of the piston rod member.

Current technology as published uses elongated fluid actuator arrangements that are designed with specific features for achieving desired pressure performance and pressure distribution for different motion rates and actuating forces. This may imply overweight and over-dimension materials.

Current technology also often uses a centrally controlled operation for controlling maximum motion rate and force of the piston rod member by means of regulating the fluid flow and pressure of the fluid supply device. Such centrally controlled feeding of fluid may make such arrangement ineffective.

U.S. Pat. No. 4,506,867 discloses a jacking apparatus for effecting motion of loads by means of two double-acting hydraulic cylinders for providing increased force of a power stroke. Hydraulic fluid pressure is controlled to a predetermined flow rate to the hydraulic cylinders for increasing the speed of a repositioning stroke of the apparatus.

U.S. Pat. No. 3,220,317 discloses a servo system having a hydraulic motor system with two pistons arranged in tandem for each motor. The system uses two motors connected in parallel so that their motions are in fixed proportions and their forces are added. The system may also be arranged with the motors in series so that forces are in fixed proportions and that motion is added.

U.S. Pat. No. 4,526,086 discloses a piston-cylinder assembly for displacing a load through a long strike. The assembly consists of a rod and a piston slideable on the rod and a cylinder in which the piston is contained. The piston is clamped to the rod by fluid pressure. By clamping the piston to the rod and introducing fluid into the cylinder, relative movement is caused between the piston and cylinder and the rod. When one assembly is used, the movement is intermittent but, by mounting two pistons on the rod, each piston being in a separate cylinder, and by controlling the flow of fluid, the movement is continuous.

SUMMARY OF THE INVENTION

An object of the present invention is to provide a fluid actuator arrangement with an improved robustness and reliability in functionality.

This has in different embodiments been achieved by means of a fluid actuator arrangement comprising a piston rod member, at least two cylinders, a clamping mechanism associated to each cylinder, and a control element. Each cylinder has a piston body dividing an interior of the cylinder in a first and a second cylinder chamber. Each clamping mechanism is arranged to engage the piston body of the associated cylinder to the piston rod member to drive the piston rod member, and to disengage the piston body of the cylinder from the piston rod member to allow sliding of the piston body in relation to the piston rod member. The control element comprises a piston body movement control element arranged to control a back and forward movement of the respective piston body so that forward movement is slower than the backward movement. The piston body movement control element is further arranged to control the movement of the respective piston bodies in relation to each other such that at least one piston body is always moving forward and such that an overlap exists wherein at least two of the piston bodies are moving forward simultaneously during a cycle. The control element comprises further a clamping mechanism control element arranged to control the respective clamping mechanism to engage the associated piston body to the piston rod member in the forward movement and to disengage the associated piston body from the piston rod member in the backward movement.

The control of the back and forward movement of the respective piston body so that forward movement is slower than the backward movement and so that for each cycle an overlap exists wherein at least two of the piston bodies are moving forward simultaneously enables a smooth movement of the piston body member. The back and forward movement can be smoothly controlled so as to minimize wear of the fluid actuator arrangement. Further, the length of the overlap can be selected to secure the smooth movement of the piston body member.

The forward movement forms a forward stroke and the backward movement forms a retraction stroke.

In using the fluid actuator arrangement above, even if there is variation in axial force acting upon the piston rod member and/or variation in time for engagement and disengagement of the clamping mechanisms, the robust and reliable behaviour is maintained.

The fluid actuator arrangement is energy saving. The fluid actuator arrangements can be applied to long distance and extended piston rod members. These are preferably put into use in e.g. lifts and high bay storage arrangements having extended and relatively long piston rods.

Energy efficiency of a fluid actuator arrangement operating under various motion/movement and force performance is increased. There would be no need for any additional energy consuming throttling valves.

Further, the fluid actuator arrangement exhibits a lower weight compared with prior art fluid actuator arrangements.

The fluid actuator arrangement can accomplish work with only minor amount of input force.

Further, the environmental impact can be minimized as noise levels can be lowered and/or leakage can be reduced.

The fluid actuator arrangement may be used in mobile and industrial applications.

The fluid actuator arrangement can be used in material handling equipment, agricultural equipment, vehicles, excavators, wellhead and jacking systems, construction equipment, hydraulic presses and others.

The fluid actuator arrangement can be adapted to 3D-printing in plastic, composite and/or metal applications for aircraft or automotive industry. The fluid actuator arrangement can be used in automated storage and retrieval systems for car parking and rough-terrain robots, so called legged robot systems. The fluid actuator arrangement can be used in military equipment utilizing hydraulic and/or pneumatic mechanisms. This includes armoured personnel carriers, aircraft material handlers, cranes and loaders, hook lifts, track adjusters and truck-mounted bridge layers etc.

In one option, the control element is arranged to activate a safety mode upon detection of a deviation from a normal behaviour and/or upon detection of activation of an emergency brake. For example, in this safety mode, the operation of the fluid actuator arrangement can be stopped and/or an alarm can be presented to an operator. The alarm may for example be a visual alarm and/or an audio alarm. With this safety function, any possible demand for a safety function for stopping the arrangement can be satisfied. Further, potential damage to the fluid actuator arrangement can be avoided.

In one option, the fluid actuator arrangement comprises said emergency brake.

In different embodiments, in the safety mode, at least one of the clamping mechanisms can be arranged to clamp around the piston rod member. Accordingly, it can be secured that the piston rod member is held in the fixed position in the safety mode. Further, the control element can cut off electricity at least to the rest of the fluid actuator arrangement. Safety can accordingly be prioritized. In accordance with these embodiments, the behaviour of the fluid actuator arrangement when not operating accurately is defined. The risk of potential damage and heavy wear of the fluid actuator arrangement is minimized.

In one option, the fluid actuator arrangement further comprises a stationary clamping mechanism arranged along the extension of the piston rod member and adapted to clamp around the piston rod member in a safety mode. Accordingly, it can be secured that the piston rod member is held in the fixed position in the safety mode. Further, the control element can cut off electricity at least to the rest of the fluid actuator arrangement. Safety can accordingly be prioritized. In accordance with these embodiments, the behaviour of the fluid actuator arrangement when not operating accurately is defined. The risk of potential damage and heavy wear of the fluid actuator arrangement is minimized.

In different embodiments, the fluid actuator arrangement further comprises a non-return valve arranged between at least one of the clamping mechanisms and a pressure supply arranged to power the clamping mechanism; and an accumulator arranged to power at least one of the clamping mechanism in the safety mode. Thereby, the pressure of said at least one clamping mechanism is maintained in the safety mode.

In one option, the fluid actuator arrangement comprises a sensor arrangement arranged to obtain position information related to the position of the piston body within the cylinder. The clamping mechanism control element is arranged to control the respective clamping mechanism and/or the piston body movement control element is arranged to control the movement of the respective piston body based on the obtained position information related to the piston body within the cylinder.

Thus, the fluid actuator arrangement is controlled based on the position information obtained by the sensor arrangement. Then, at least the piston body movement control element can control the motion of the piston bodies to force them to the positions they should be. Thereby, synchronisation of the fluid actuator arrangement is obtained.

In accordance with different embodiments, the sensor arrangement comprises at least one position and/or presence sensor arranged to obtain position information related to the position of the piston body within the cylinder.

In accordance with different embodiments, the sensor arrangement comprises at least one sensor mounted within the cylinder.

In accordance with different embodiments, the sensor arrangement arranged to obtain position information related to the position of the piston body comprises at least one position and/or presence sensor arranged to sense the position/presence of the clamping mechanism and in that the control element is arranged to the determine the position of the piston body within the cylinder based on the sensed position/presence of the clamping mechanism.

In accordance with different embodiments, the sensor arrangement arranged to obtain position information related to the position of the piston body comprises a continuous position sensor arranged to continuously obtain position information related to the position of the piston body.

The control element may be arranged to perform a more fine-tuned control when continuously provided with position information related to the position of the piston body. The more fine-tuned control may result in that the piston bodies may be controlled to move faster, and accordingly the piston rod member can also move faster. Further, the overlap wherein both piston bodies are moving in the forward direction can be decreased.

In accordance with different embodiments, the sensor arrangement is arranged to obtain first position information indicating that the piston body passes a first position along its stroke. The clamping mechanism control element is arranged to control the respective clamping mechanism and/or the piston body control element is arranged to control the back and forward movement of the respective piston body based on the obtained first position information. Further, the sensor arrangement is arranged to obtain second position information indicating that the piston body passes a second position along its stroke. The clamping mechanism control element is arranged to control the respective clamping mechanism and/or the piston body control element is arranged to control the back and forward movement of the respective piston body based on the obtained second position information.

In accordance with different embodiments, the sensor arrangement is arranged to obtain third position information indicating that the piston body reaches an end of a stroke. The clamping mechanism control element is arranged to control the respective clamping mechanism and/or the piston body control element is arranged to control the back and forward movement of the respective piston body based on the obtained third position information.

In different embodiments, the fluid actuator arrangement further comprises a counter arranged to determine the timing of the end of a stroke. The clamping mechanism control element is arranged to control the respective clamping mechanism and/or the piston body control element is arranged to control the back and forward movement of the respective piston body based on the determined timing of the end of the stroke. The use of a counter for determining the current position may form part of a cost effective sensor arrangement in a fluid actuator arrangement. The counter may form part of the control element.

In different embodiments, the control element is further arranged to monitor the obtained position information related to the position of the piston body and to activate the safety mode when the obtained position information related to the position of the piston body deviates from an expected behaviour.

Accordingly, if the monitoring reveals that the piston bodies are not moving as scheduled, the fluid actuator arrangement can be immediately stopped. With this safety function, potential damage to the fluid actuator arrangement can be avoided. Thereby, any possible demand for a safety function for stopping the arrangement can be satisfied. Further, as the fluid actuator arrangement can be stopped when the smooth movement is interrupted, wear of the components of the fluid actuator arrangement can be decreased.

Sensors may be present to both sense the position/presence of the piston bodies within the cylinders and to sense the position/presence of the clamping mechanisms. The control element can then rely the control of the fluid actuator arrangement at least mostly on the sensing of the position/presence of the piston bodies. It is the control of the positions of the piston bodies which is critical for the performance of the fluid actuator arrangement. Accordingly, the control of the fluid actuator arrangement is preferably made based on sensors sensing the positions/presence of the piston bodies. The control element can further rely the monitoring of the fluid actuator arrangement mainly on the sensing of the position/presence of the respective clamping mechanisms. The monitoring of the fluid actuator arrangement is preferably performed by monitoring the movement of the piston rod member. One indicator of the movement of the piston rod member is the movement of the clamping mechanisms.

The fluid actuator arrangement comprises in one option a piston rod member sensor arrangement arranged to obtain information related to the piston rod member.

In accordance with this option, the clamping mechanism control element may be arranged to control the respective clamping mechanism based on the information from the piston rod member sensor arrangement. Instead or in addition thereto, the piston body control element is arranged to control the back and forward movement of the respective piston body based on the information from the piston rod member sensor arrangement.

In one option, the control element is arranged to activate the safety mode based on the information from the piston rod member sensor arrangement. As stated above, the monitoring of the fluid actuator arrangement is preferably performed by monitoring the movement of the piston rod member.

In one option, the piston rod sensor arrangement is arranged to obtain information related to the position and/or the velocity and/or the acceleration of the piston rod member. The piston rod sensor arrangement may for example comprise a potentiometer and/or a linear variable differential transformer, LVDT, and/or a resolver and/or an optic sensor and/or a magnetic sensor and/or an accelerometer.

In one option, the control element is arranged to tune an algorithm for control of the back and forward movement of the respective piston body based on the obtained information related to the piston rod member. Instead or in addition thereto, the control element may be arranged to tune an algorithm for the control of the engagement and disengagement of the respective piston body based on the obtained information related to the piston rod member.

Thus, parameters in the algorithm(s) can be tuned in accordance with made measurements to adapt to prevailing conditions.

The fluid actuator arrangement comprises in one option a pressure sensor arrangement arranged to obtain pressure information related to the pressure in the respective first and/or second cylinder chamber and/or in a supply. The pressure sensor arrangement may comprise one or more sensors. The number of sensors and/or positioning of the sensors may be adapted to provide redundancy and/or a desired accuracy. For example in a safety critical application, redundancy is of particular importance.

Parameters in the algorithm(s) can be tuned in accordance with made pressure measurements to adapt to prevailing conditions. Further, the control element can determine which piston body carries the load based on the obtained pressure information. This information can also be used to tune the algorithm(s).

The at least two cylinders are in different embodiments arranged along the extension of the piston rod member so that the piston rod member extends through the respective piston body.

A transfer element is in different embodiments arranged to transfer the movement from the respective piston body to the associated clamping mechanism. Thus, the respective clamping mechanism is arranged to engage the associated piston body of the cylinder to the piston rod member via the respective transfer element. The cylinders may be arranged at a radial distance from piston rod member and the clamping mechanisms.

In different embodiments, a control element controls a fluid actuator arrangement comprising a piston rod member, at least two cylinders, each cylinder having a piston body dividing an interior of the respective cylinder in a first and a second cylinder chamber, a clamping mechanism associated to each cylinder, said clamping mechanism being arranged to engage the piston body of the cylinder to the piston rod member to drive the piston rod member, and to disengage the piston body of the cylinder from the piston rod member to allow sliding of the piston body in relation to the piston rod member. The control element comprises a piston body movement control element arranged to control a back and forward movement of the respective piston body so that forward movement is slower than the backward movement and to control the movement of the respective piston bodies in relation to each other such that at least one piston body is always moving forward and such that an overlap exists wherein at least two of the piston bodies are moving forward simultaneously during a cycle. The control element comprises further a clamping mechanism control element arranged to control the respective clamping mechanism to engage the piston body to the piston rod member in the forward movement and to disengage the piston body from the piston rod member in the backward movement.

In different embodiments, a method for control of a fluid actuator arrangement comprises controlling a back and forward movement of the respective piston body so that forward movement is slower than the backward movement and so that at least one piston body is always moving forward and such that for each cycle an overlap exists wherein at least two of the piston bodies are moving forward simultaneously, and controlling the respective clamping mechanism to engage its associated piston body to the piston rod member in the forward movement and to disengage the respective piston body from the piston rod member in the backward movement. The fluid actuator arrangement comprises a piston rod member at least two cylinders each said cylinder having a piston body dividing an interior of the respective cylinder in a first and a second cylinder chamber, a clamping mechanism associated to each cylinder, said clamping mechanism being arranged to engage the piston body of the cylinder to the piston rod member to drive the piston rod member, and to disengage the piston body of the cylinder from the piston rod member to allow sliding of the piston body in relation to the piston rod member.

In different embodiments, the method for control of a fluid actuator arrangement comprises obtaining sensor data related to the position of the respective piston body, wherein the respective clamping mechanism and/or the respective back and forward movement is controlled based on the obtained sensor data related to the position of the respective piston body.

In different embodiments, the method for control of a fluid actuator arrangement comprises obtaining sensor data related to the position and/or the velocity and/or the acceleration of the rod member, wherein the respective clamping mechanism and/or the respective back and forward movement is controlled based on the obtained sensor data related to the position and/or the velocity and/or the acceleration of the rod member.

In different embodiments, the method for control of the fluid actuator arrangement comprises obtaining sensor data related to the pressure of the first and/or second chamber of the first and/or second cylinder and/or a the pressure of a supply to the respective chambers, wherein the respective clamping mechanism and/or the respective back and forward movement is controlled based on the obtained sensor data related to pressure of the first and/or second chamber of the first and/or second cylinder and/or a the pressure of a supply to the respective chambers.

The present disclosure also relates to a computer program comprising a program code for executing the method for control of a fluid actuator arrangement.

BRIEF DESCRIPTION OF THE DRAWINGS

The present invention will now be described by way of examples with references to the accompanying schematic drawings, of which.

DETAILED DESCRIPTION

Hereinafter, embodiments of the present invention will be described in detail with reference to the accompanying drawings, wherein for the sake of clarity and understanding of the invention some details of no importance may be deleted from the drawings.

Figure 1A:
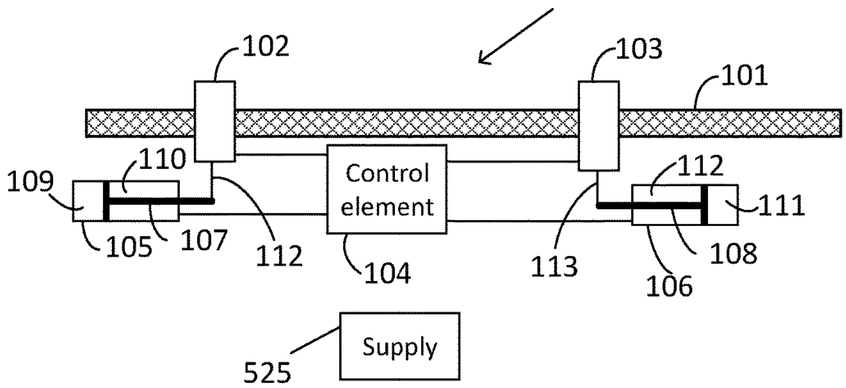
FIG. 1*a* illustrates a first example of a fluid actuator arrangement.
Figure 1B:
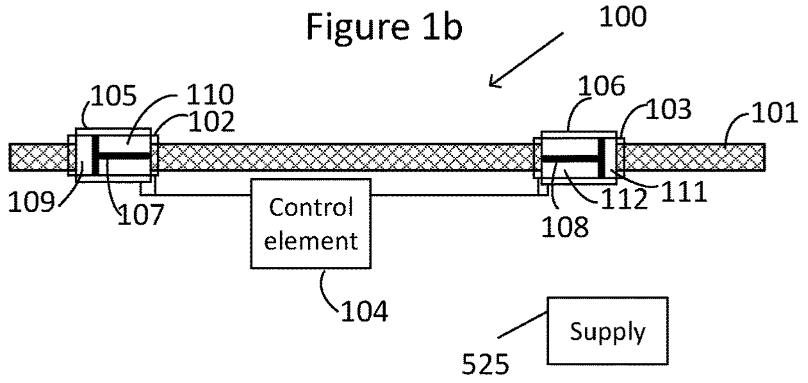
FIG. 1*b* illustrates a second example of a fluid actuator arrangement.

FIGS. 1*a* and 1*b* schematically show a fluid actuator arrangement 100. The fluid actuator arrangement is elongated. The fluid actuator arrangement 100 is arranged to provide a smooth motion to a piston rod member 101.

The fluid actuator arrangement 100 comprises the piston rod member 101, and a first and a second cylinder 105, 106. The respective cylinder 105, 106 comprises a piston body 107, 108. The respective piston body 107, 108 divides an interior of the respective cylinder into a first cylinder chamber 109, 111 and a second cylinder chamber 110, 112. The respective piston body is controlled by controlling a pressure of the first and second cylinder chamber. The pressure is provided by one or a plurality of supplies such as a fluid supply 525. The controlling of the piston bodies by means of pressurizing the cylinder chambers is known in the art and will not be described in detail herein. FIGS. 1*a*, and 1*b* are very schematic and the arrangement for control of the piston bodies (including valves etcetera) by means of the pressure supply 525 is not described in detail herein.

A clamping mechanism 102, 103 is associated to each cylinder 105, 106. The respective clamping mechanism 102, 103 is arranged to engage the piston body of the cylinder to the piston rod member 101 and to disengage the respective clamping mechanism 102, 103 from the piston rod member 101. When engaged, the piston body drives the piston rod member. When disengaged, the piston body is allowed to slide in relation to the piston rod member. The clamping mechanisms may be individually controlled to engage/disengage the piston rod member by means of the pressure from the pressure supply 525. The respective clamping mechanism may comprise an expandable part (not shown) which when expanded by means of the pressure from the pressure supply 525 engages the clamping mechanism to the piston rod member and which when not expanded disengages the clamping mechanism from the piston rod member. FIGS. 1*a*, and 1*b* are as stated above very schematic and the arrangement for control of the clamping mechanisms (including valves etcetera) by means of the pressure supply 525 is not disclosed herein.

A control element 104 is arranged to control a back and forward movement of the respective piston body 107, 108 so that forward movement is slower than the backward movement. The control element 104 is further arranged to control the movement of the respective piston bodies in relation to each other such that at least one piston body is moving forward at each moment and such that an overlap exists wherein at least two of the piston bodies are moving forward simultaneously during a cycle.

The control element is further arranged to control the respective clamping mechanism 102, 103 to engage the piston body 107, 108 to the piston rod member in the forward movement and to disengage the piston body from the piston rod member in the backward movement.

By alternating controlling the respective first and second piston body and the engagement and disengagement of the clamping mechanism, the piston rod member can be propelled a considerable distance. The piston rod member is thus allowed to perform extremely long strokes.

The fluid actuator arrangement further comprises a sensor arrangement arranged to obtain position information related to the position of the piston body within the cylinder. The clamping mechanism control element is then arranged to control the respective clamping mechanism based on the obtained position information related to the position of the piston body within the cylinder. The piston body movement control element is then further arranged to control the movement of the respective piston body based on the obtained position related to the position of the piston body within the cylinder.

In FIG. 1*a*, a transfer element 112, 113 is arranged to transfer the movement from the respective piston body 107, 108 to the associated clamping mechanism 102, 103. Thus, the respective clamping mechanism 102, 103 is arranged to engage the associated piston body of the cylinder to the piston rod member 101 via the respective transfer element 112, 113. In the illustrated example, the cylinders 105, 106 are arranged at a radial distance from piston rod member 101 and the clamping mechanisms.

In FIG. 1*b*, the cylinders 105, 106 are arranged along the extension of the piston rod member so that the piston rod member extends through the respective piston body 107, 108. The cylinders 105, 106 are arranged coaxially with the piston rod member 101.

FIGS. 2*a*-2*e* disclose different examples of mounting a sensor arrangement. The sensor arrangement comprises in the illustrated example at least one position and/or presence sensor 220*a*, 220*b*, 221, 222, 224*a* within a cylinder 205. The cylinder 205 comprises a piston body 207. The piston body 207 divides an interior of the cylinder 205 in a first cylinder chamber 211 and a second cylinder chamber 212.

The at least one position and/or presence sensor comprises in different embodiments at least one presence sensor 220*a*, 221, 222, 224*a*. The presence sensor(s) may comprise at least one proximity switch, and/or at least one inductive proximity switch. The at least one position and/or presence sensor comprises in different embodiments a continuous position sensor 220*b* arranged to continuously obtain position information related to the position of the piston body.

Figure 2A:
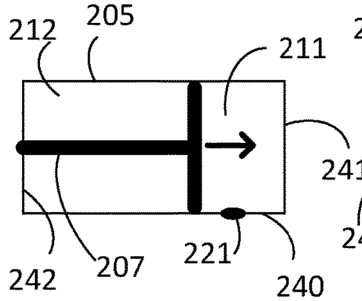
FIGS. 2*a* to 2*e* illustrate examples of position/presence sensor configurations at a cylinder in a fluid actuator arrangement.

In FIG. 2*a*, the at least one position and/or presence sensor comprises a first sensor 221 arranged in the interior of the cylinder. The first sensor 221 is in the illustrated example positioned along a side wall 240 of the cylinder. In one example the first sensor 221 is a presence sensor arranged to detect that the piston body passes the first sensor 221. The first sensor 221 is in one example positioned to indicate when presence detected that the piston body moving along its stroke should slow down and perform initiation of a retracting movement.

Figure 2B:
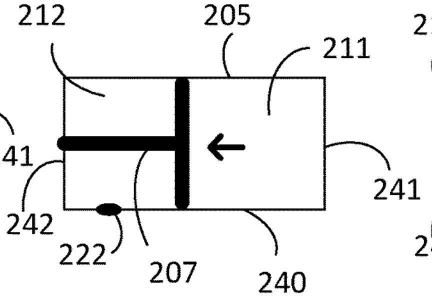

In FIG. 2*b*, the at least one position and/or presence sensor comprises a second sensor 222 arranged in the interior of the cylinder. The second sensor 221 is in the illustrated example positioned along a side wall of the cylinder. In one example the second sensor 222 is a presence sensor arranged to detect that the piston body passes the second sensor 222. The second sensor 222 is in one example positioned to indicate when presence detected that the piston body performing a retraction movement should slow down and perform initiation of a stroke.

Figure 2C:
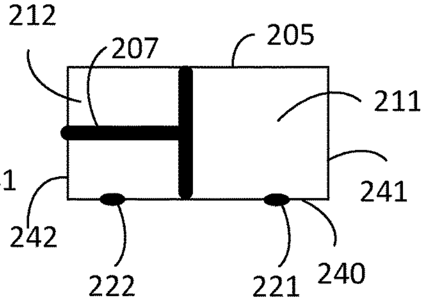

In FIG. 2*c*, the at least one position and/or presence sensor comprises both a first sensor 221 and a second sensor 222 arranged in the interior of the cylinder. The first and second sensors 221, 222 are in the illustrated example positioned along a side wall 240 of the cylinder. As described above, the first and second sensors 221, 222 can be presence sensors arranged to detect passage of the piston body. The first sensor 221 is in one example as described above positioned to indicate when presence detected that the piston body moving along its stroke should slow down and perform a retracting movement. The second sensor 222 is in one example as described above positioned to indicate when presence detected that the piston body performing a retraction movement should slow down and perform a stroke.

Figure 2D:
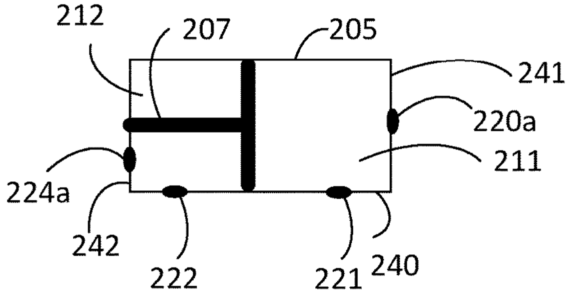

In FIG. 2*d*, the at least one position and/or presence sensor comprises a third sensor 220*a* arranged in the interior of the cylinder. The third sensor 220*a* is in the illustrated example positioned at an end wall 241 of the cylinder situated at an end of a stroke. In one example the third sensor 220*a* is a presence sensor arranged to detect that the piston body approaches the third sensor 220*a*. The third sensor 220*a* is in one example positioned to indicate when presence detected that the piston body performing a stroke should initiate a retracting movement. The at least one position and/or presence sensor may also or instead comprise a fourth sensor 224*a* arranged in the interior of the cylinder. The fourth sensor 224*a* is in the illustrated example positioned at an end wall 242 of the cylinder situated at an end of the retraction movement. In one example the fourth sensor 224*a* is a presence sensor arranged to detect that the piston body approaches the fourth sensor 224*a*. The fourth sensor 224*a* is in one example positioned to indicate when presence detected that the piston body performing a retraction movement should initiate a working stroke.

Thus, in different embodiments, the above described first and/or second and/or third and/or fourth sensor is a presence sensor arranged to detect presence of the piston body at first and/or second and/or third and/or fourth positions.

A counter can be arranged to determine the position of the piston body in positions between the first and/or second and/or third and/or fourth positions. Further, a counter can be used to substitute one or a plurality of the first, second, third and fourth sensors. The control unit may comprise the counter.

A control element may be used to control a fluid actuator arrangement based a sensor arrangement. The sensor arrangement may comprise at least one position/presence sensor for example as exemplified in FIGS. 2*a*-2*d*. For example, a clamping mechanism control element may be arranged to control the respective clamping mechanism based on the obtained first position information. The piston body control element may further be arranged to control the back and forward movement of the respective piston body based on the obtained first position information. Further, the clamping mechanism control element may then be arranged to control the respective clamping mechanism and/or the piston body control element may be arranged to control the back and forward movement of the respective piston body based on the obtained second position information. Further, the clamping mechanism control element may be arranged to control the respective clamping mechanism and/or the piston body control element may be arranged to control the back and forward movement of the respective piston body based on the obtained third position information. Further, the clamping mechanism control element may be arranged to control the respective clamping mechanism and/or the piston body control element may be arranged to control the back and forward movement of the respective piston body based on the obtained fourth position information.

Further, the clamping mechanism control element can be arranged to control the respective clamping mechanism and/or the piston body control element can be arranged to control the back and forward movement of the respective piston body based on the position of the piston body as determined by the counter.

Instead or in addition to the above referenced presence sensor(s) optionally with the addition of a counter, the sensor arrangement may comprise a continuous position sensor arranged to continuously obtain position information related to the position of the piston body.

Figure 2E:
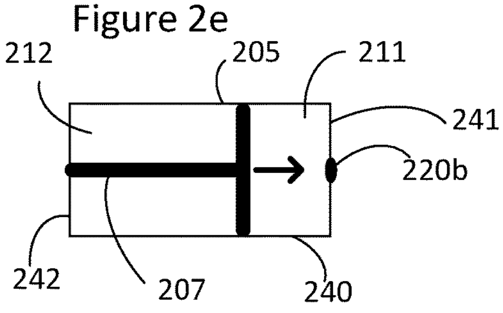

In FIG. 2*e*, the sensor arrangement comprises a continuous position sensor 220*b* arranged to continuously obtain position information related to the position of the piston body. The continuous position sensor 220*a* is in the illustrated example positioned at an end wall of the cylinder at an end of a stroke. One or a plurality of presence sensors may be added to the continuous position sensor.

Figure 3:
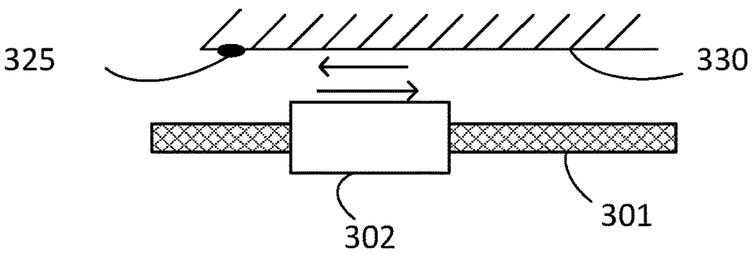
FIG. 3 illustrates an example of a position/presence sensor configuration at a clamping mechanism in a fluid actuator arrangement.

In FIG. 3, at least one sensor of a sensor arrangement is arranged to sense the position/presence of a clamping mechanism 302. The clamping mechanism is arranged to grip or slide along a piston rod member 301. The control element is then arranged to determine a position of the piston body within the cylinder based on the sensed position/presence of the clamping mechanism 302. In the illustrated example, the clamping mechanism 302 is moving back and forward in relation to a stationary wall 330. A presence sensor 325 is in the illustrated example mounted on the wall 220. In the illustrated example, only one presence sensor is illustrated for the respective clamping mechanism. However, a plurality of presence sensors may be provided to obtain updated position information for the clamping mechanism.

In different embodiments, the sensor arrangement comprises both position and/or presence sensors arranged to sense the position/presence of the clamping mechanism and position and/or presence sensors arranged to sense the position of the piston body within the cylinder. The clamping mechanism control element can be arranged to control the respective clamping mechanism and/or the piston body control element can be arranged to control the back and forward movement of the respective piston body both based on both the sensed position/presence of the clamping mechanism and/or the sensed position of the piston body within the cylinder.

Figure 4:
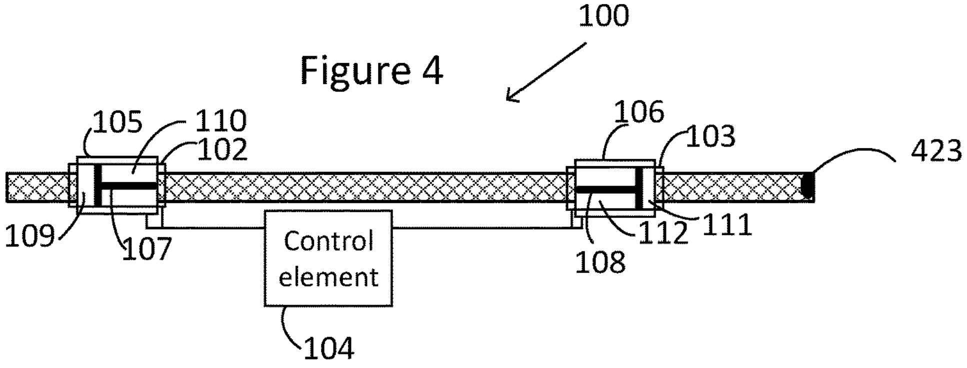
FIG. 4 illustrates an example of a position/presence sensor configuration at fluid actuator arrangement.

In FIG. 4, a fluid actuator arrangement 100 comprises a piston rod member sensor arrangement 423 arranged to obtain information related to the piston rod member. The active part of the piston rod sensor may be arranged on the piston rod member or a fixed structure, in relation to which the piston rod member is arranged to move. The piston rod member sensor arrangement may be arranged to continuously obtain position information and/or velocity information and/or acceleration information. The clamping mechanism control element may then be arranged to control the respective clamping mechanism and/or the piston body control element may be arranged to control the back and forward movement of the respective piston body based on the information from the piston rod member sensor arrangement. The piston rod member sensor arrangement 423 may be arranged to directly measure the obtained information related to the piston rod member or to calculate at least some of the information based on measured data.

The piston rod sensor arrangement 323 may comprise a potentiometer and/or a linear variable differential transformer, LVDT, and/or a resolver and/or an optic sensor and/or a magnetic sensor and/or an accelerometer.

Figure 5A:
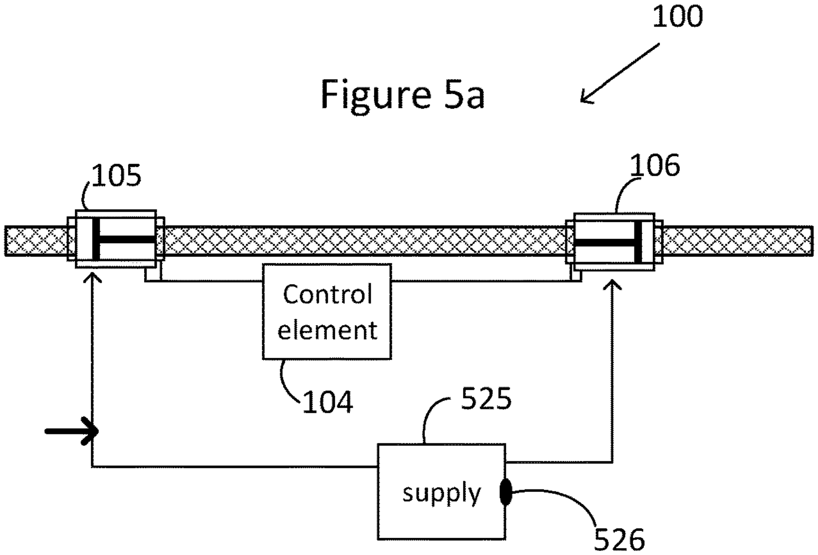
FIG. 5*a* illustrates an example of a position/presence sensor configuration at a supply in a fluid actuator arrangement.
Figure 5B:
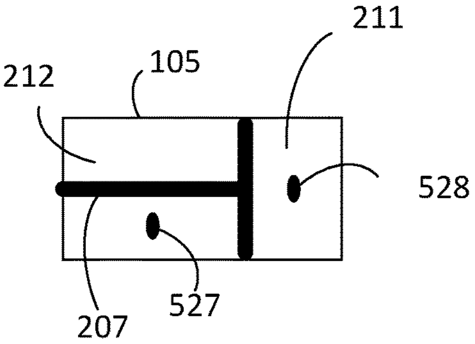
FIG. 5*b* illustrates a further example of a position/presence sensor configuration at a cylinder in a fluid actuator arrangement.

In FIGS. 5*a*-5*b*, a fluid actuator arrangement 100 comprises a pressure sensor arrangement 526, 527, 528 arranged to obtain pressure information related to the pressure in the respective first and/or second cylinder chamber 211, 212 and/or in a supply 525.

The control element may then be arranged to perform control based on the obtained pressure information related to the pressure in the respective first and/or second cylinder chamber 211, 212 and/or in the supply 525. For example it can be determined which piston carries the load based on the pressure in the first and/or second cylinder chamber of the respective cylinder 105, 106.

In FIG. 5*a*, a pressure sensor 526 arranged to sense the pressure in a supply 525 is highlighted. The supply is a supply of hydraulic pressure.

In FIG. 5*b*, pressure sensors 527, 528 of a respective cylinder chamber 211, 212 in a cylinder 105 are highlighted.

Figure 6:
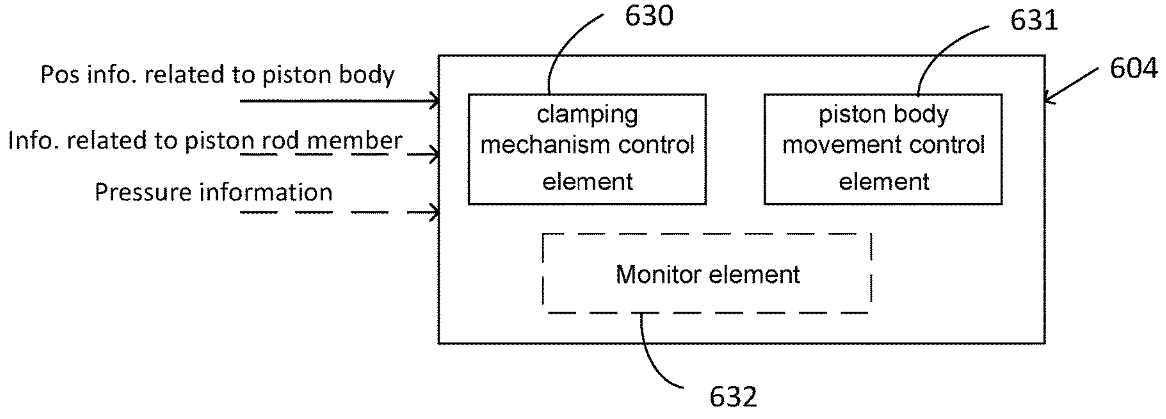
FIG. 6 illustrates an example of a control element for a fluid actuator arrangement.

In FIG. 6, an example of a control element 604 for control of a fluid actuator arrangement is illustrated. The fluid actuator arrangement comprises a piston rod member, at least two cylinders, and a clamping mechanism associated to each cylinder. Each cylinder has a piston body dividing an interior of the respective cylinder in a first and a second cylinder chamber. Each clamping mechanism is arranged to engage the piston body of the cylinder to the piston rod member to drive the piston rod member, and to disengage the piston body of the cylinder from the piston rod member to allow sliding of the piston body in relation to the piston rod member.

The control element 604 comprises a piston body movement control element 631 arranged to control a back and forward movement of the respective piston body so that forward movement is slower than the backward movement. The piston body movement control element 631 is further arranged to control the movement of the respective piston bodies in relation to each other such that at least one piston body is always moving forward and such that an overlap exists wherein at least two of the piston bodies are moving forward simultaneously during a cycle. A clamping mechanism control element 630 is arranged to control the respective clamping mechanism to engage the piston body to the piston rod member in the forward movement (stroke) and to disengage the piston body from the piston rod member in the backward movement (retraction).

The control element 604 is arranged to receive sensor information and to use the sensor information in control of the fluid actuator arrangement. The control element 604 is arranged to receive position information related to the position of the piston body and to control the fluid actuator arrangement based on the position information related to the position of the piston body. The received position information related to the position body is obtained from sensors arranged to detect presence/position of the piston body and/or from sensors arranged to detect presence/position of the clamping mechanism. There is a known relation between the position of the clamping mechanism and the associated piston body. Thus, the position information from the sensors arranged to detect presence/position of the clamping mechanism forms position information related to the position body.

Thus, the control element 604 is arranged to perform control based on the information related to the position of the piston body. In different embodiments, the control element is arranged to perform control based on a zone dependent algorithm. As stated above, the control element 604 is arranged to control the movement of the piston body such that for each cycle the entire stroke movement is faster than the entire retraction movement.

Generally, the control element 604 is arranged to perform control based on the received position information related to the position of the piston body to control the positions of the piston bodies and control them to be where they should be. Thereby, synchronisation between the operations of the cylinders is achieved.

In different embodiments, sensors are provided to determine movement of the piston bodies or the clamping mechanisms, or both. Control based on sensors detecting the movement of the piston bodies is beneficial for controllability of the fluid actuator arrangement. Control based on sensors detecting the movement of the clamping mechanisms is beneficial for safety of the fluid actuator arrangement.

The control element 604 may be arranged to perform control based on the information related to piston rod member. The control element 604 may be arranged to tune an algorithm for control of the back and forward movement of the respective piston body and/or to tune an algorithm, for the control of the engagement and disengagement of the respective piston body based on the obtained information related to the piston rod member.

The control element 604 may be arranged to perform control based on the obtained pressure information. The control element 604 may for example be arranged to determine which piston body carries the load based on the obtained pressure information.

In the illustrated example, the control element further comprises a monitor element 632 arranged to monitor the obtained position information related to the piston body and/or the information related to the piston rod member and/or the pressure information, if available. The monitor element 632 is further arranged to activate a safety mode when the obtained information deviates from expected. In different embodiments, the control element 604 is arranged to stop the operation of the fluid actuator arrangement in the safety mode. In different embodiments, when in the safety mode, the monitor element 632 is arranged to provide an alarm presented to an operator. The alarm may be provided visually and/or as a sound.

In different embodiments, the monitor element 632 is arranged to activate at least one of the clamping mechanisms to clamp around the piston rod member in the safety mode. In different embodiments, the monitor element 632 is arranged to activate a stationary clamping mechanism arranged to clamp around the piston rod member in the safety mode. The control element can then cut off power to the fluid actuator arrangement. That or those clamping mechanism(s)/stationary mechanism(s) intended to be activated in the safety mode can be powered by a separate source. Thus, safety can be prioritized. Further, it can be secured that the piston rod member is held in a fixed position in the safety mode. Thereby the behaviour of the fluid actuator arrangement when not operating accurately is defined. The risk of potential damage and heavy wear of the fluid actuator arrangement is minimized.

Figure 9A:
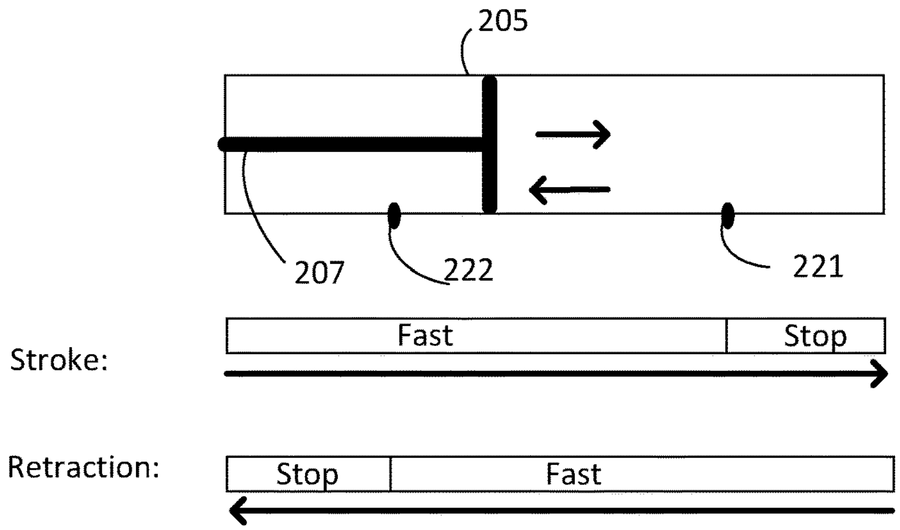
FIGS. 9*a* and 9*b* illustrate examples of the dividing of the control of a piston body in different phases of a stroke and/or a retraction movement.

In different embodiments disclosed in relation to FIG. 9*a*, at least one of the stroke and retraction movements is divided into at least two phases, a fast phase during a main part of the movement and a stop phase at the end of the movement. In order to provide more fine-tuned movement, additional phases may be introduced. The control of the movement is performed so as to avoid that the piston body 207 hits the end point for the stroke and/or retraction movement or at least so as to avoid that the piston body hits the end point(s) at a high speed. The control may be based on sensor data obtained from a first presence sensor 221 and a second presence sensor 222. In the illustrated example, the first and the second presence sensors are arranged within the cylinders 205 However, instead and/or in addition thereto, sensor data may be obtained from sensor(s) arranged in relation to the clamping element(s). The control may also be based on other sensor data.

Figure 9B:
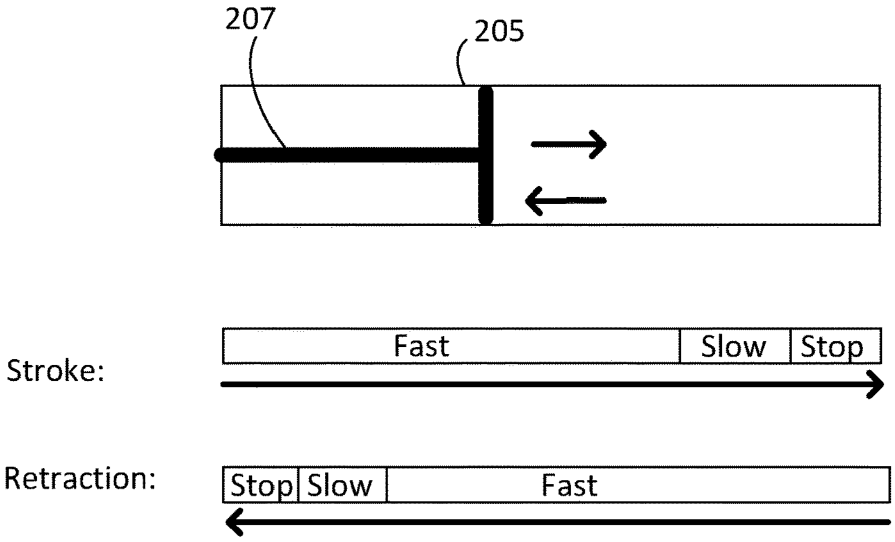

In different embodiments disclosed in relation to FIG. 9*b*, at least one of the stroke and retraction movements is divided into at least three phases, a fast phase during a main part of the movement, a slow phase when approaching the end of a movement and a stop phase at the end of the movement. In order to provide more fine-tuned movement, additional phases may be introduced. The control of the movement is performed so as to avoid that the piston body hits the end point for the stroke and/or retraction movement or at least so as to avoid that the piston body hits the end point(s) at a high speed.

This control can be made with the aid from presence sensors positioned so as to example detect that the first position is entered so as to detect that the fast phase of the stroke is to be ended and the slow phase started. This was for example illustrated in FIGS. 2*a*-2*c*. The presence sensors may also or instead be positioned so as to detect that the slow phase is to be ended and the stop phase started. This may be achieved by the different embodiments discussed in relation to FIG. 2*d*. The presence sensors may also or instead be positioned so as to detect that the stop phase is ended and that the retraction movement to be started. This may be achieved by the different embodiments discussed in relation to FIG. 2*d*.

The presence sensors may be positioned so as to detect that the fast phase of the retraction is to be ended and the slow retraction phase started. The presence sensors may also or instead be positioned so as to detect that the slow retraction phase is to be ended and the stop phase started. The presence sensors may also or instead be positioned so as to detect that the stop phase is ended and that the stroke movement to be started.

Figure 10A:
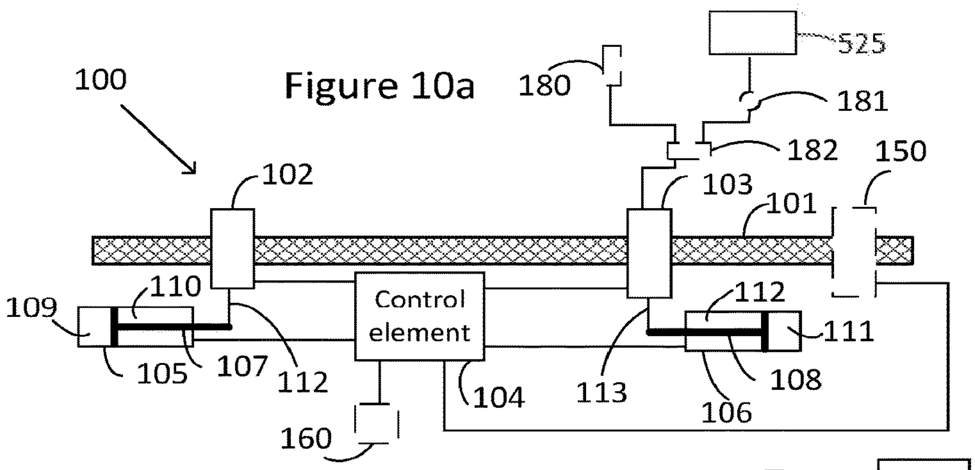
FIGS. 10*a* and 10*b* example of a fluid actuator arrangement having a stationary clamping mechanism.
Figure 10B:
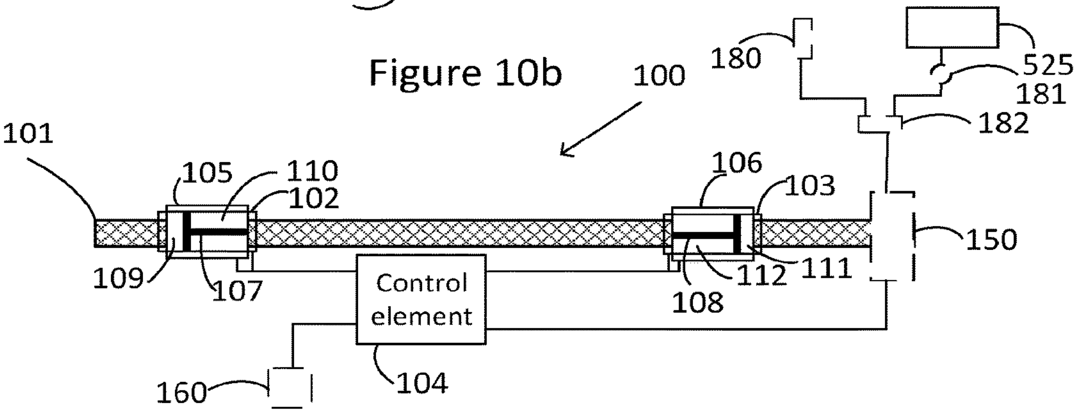

FIGS. 10*a* and 10*b*, show examples of a fluid actuator arrangement 100, as disclosed in relation to FIGS. 1*a* and 1*b*. The fluid actuator arrangement comprises optionally a stationary clamping mechanism 150. The stationary clamping mechanism 150 is in the illustrated example arranged to clamp around the piston rod member in a safety mode. The control element is arranged to control the stationary clamping mechanism to clamp around the piston rod member 101 in the safety mode. Instead or in addition thereto at least one of the clamping mechanisms 102 and 103 can be arranged to clamp around the piston rod member in the safety mode. This can be advantageously be applied in the illustrated example of FIG. 10*a*, wherein the cylinders 105, 106 are arranged at a radial distance from piston rod member 101 and connected to the respective clamping mechanism by way of a transfer element. One or a plurality of supplies such as fluid supply 525 powers one or more of the clamping mechanisms and/or the stationary clamping mechanism and/or the stationary clamping mechanism and/or the piston bodies.

Further, the fluid actuator arrangement may comprise a non-return valve 181 arranged in the line from the pressure supply 525. The non-return valve 181 is in the illustrated example in the line between the pressure supply 525 and at least one of the clamping mechanisms 102, 103 and/or the stationary clamping mechanism 150. Further, the fluid actuator arrangement further comprises an accumulator 180 arranged to accumulate pressure when pressure from the pressure supply is lost or compromised. The accumulator 180 is connectable at least one of the clamping mechanisms 102, 103 and/or the stationary clamping mechanism 150. The accumulator 180 may be connectable to an expandable part of at least one of the clamping mechanisms 102, 103 and/or the stationary clamping mechanism 150. Thus, if pressure from the pressure supply for some reason is lost or compromised, the non-return valve 181 and the accumulator tank 180 will secure pressure to at least one of the clamping mechanisms 102, 103, 150. Thus, with this set-up, the pressure engaging the clamping mechanism to the piston rod member 101 can be maintained when hydraulic (or pneumatic) and/or electrical power is lost or compromised. Accordingly, pressure engaging at least one of the clamping mechanisms 102, 103, 150 to the piston rod member 101 is maintained in the safety mode.

Further, in different embodiments, it is secured that the safety mode is entered autonomously by the fluid actuator arrangement when hydraulic/pneumatic and/or electrical power is lost or compromised. This is achieved by means of a switch element 182 arranged to operatively connect the pressure supply to the clamping mechanism 102, 103, 150 when hydraulic/pneumatic and/or electrical power is available. The switch element 182 may further be arranged to disconnect the operational connection between the pressure supply and the clamping mechanism 102, 103, 150 when hydraulic/pneumatic and/or electrical power is not available. In the illustrated example, the non-return valve 181 is arranged between the pressure supply 525 and the switch element. The switch element 182 is arranged to operatively connect the accumulator tank to at least one of the clamping mechanisms 102, 103, 150 when hydraulic/pneumatic and/or electrical power is not available. Accordingly, the operation of the switch element 182 is controlled by the hydraulic/pneumatic and/or electrical power available of the fluid actuator arrangement. In a normal mode, the switch element connects the fluid supply 525 to the clamping mechanisms 102, 103, 150. In the safety mode, the switch element connects the accumulator to at least one of the clamping elements 103, 103, 150. The switch element 182 may comprise a valve such as a solenoid on/off valve or a 3/2 valve.

The fluid actuator arrangement may also comprise an emergency brake 160. The control element is then arranged to receive a brake signal from the emergency brake and to activate the safety mode upon reception of said brake signal.

Figure 7:
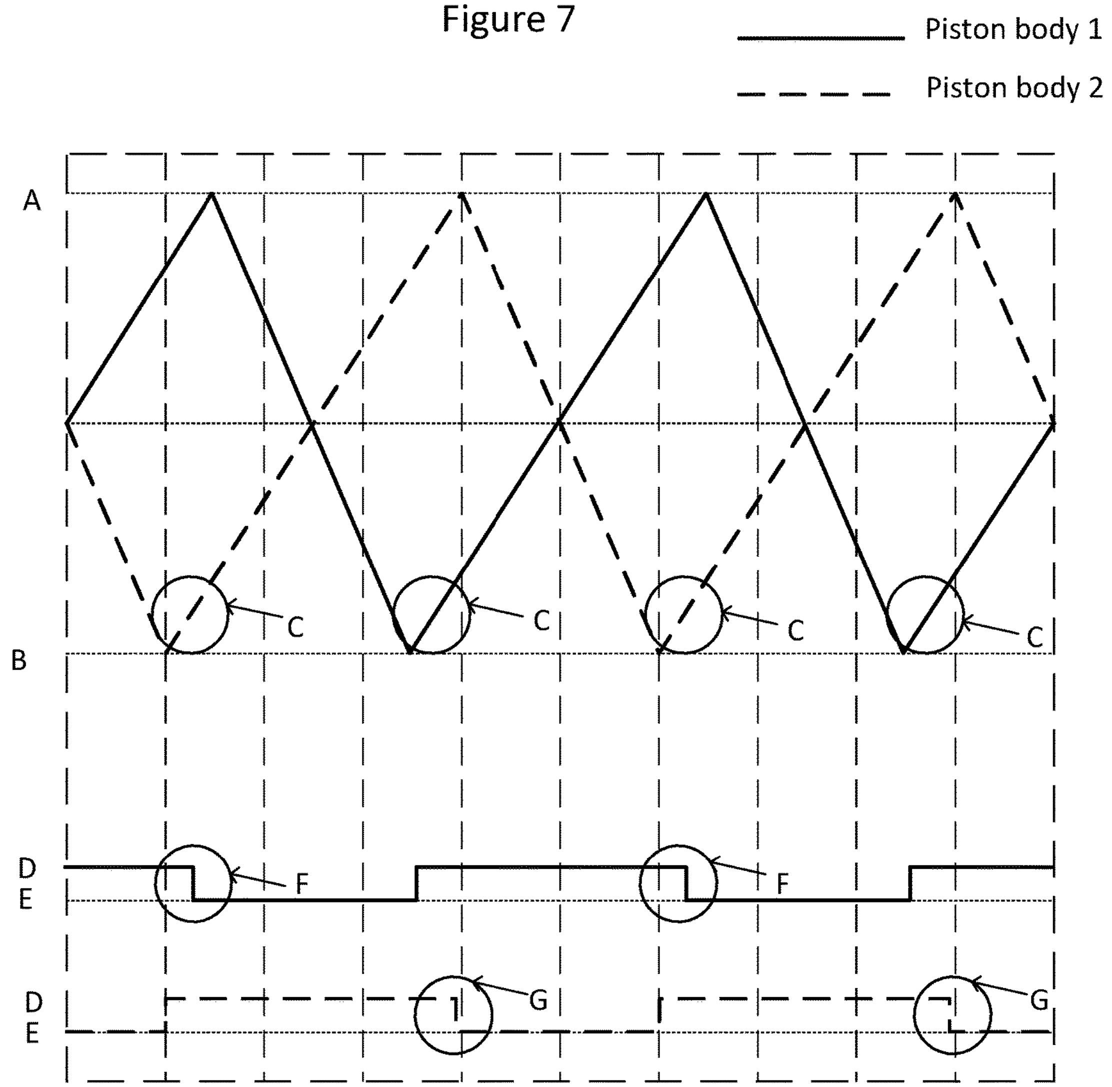
FIG. 7 is a graph schematically illustrating an example of interaction between the respective piston bodies and clamping mechanisms.

In FIG. 7, a graph is disclosed illustrating a method for control of a fluid actuator arrangement comprising a piston rod member, two cylinders each said cylinder having a piston body and a clamping mechanism associated to each cylinder. The clamping mechanism is arranged to engage the piston body of the cylinder to the piston rod member to drive the piston rod member, and to disengage the piston body of the cylinder from the piston rod member to allow sliding of the piston body in relation to the piston rod member. In the upper part of the graph, the solid line indicates the movement of the piston body of the first cylinder. The dashed line indicates the movement of the piston body of the second cylinder. The x-axis represents time. The y-axis represents the position of the piston body within the respective cylinder. The graph is schematic and the movements of the piston bodies are characteristically not linear. Rather, the piston bodies slow characteristically down when approaching an end position. In the illustrated example, reference A indicates an end position for a stroke and reference B indicates an end position for a retraction movement.

As illustrated in FIG. 7, back and forward movement of the respective piston body is controlled so that forward movement is slower than the backward movement and so that at least one of the piston bodies is always moving forward (performing a stroke). For each cycle an overlap C exists wherein both piston bodies are moving forward simultaneously.

In the lower part of the graph, the solid line indicates the engagement/disengagement flow of the clamping mechanism associated to the first cylinder movement of the piston body of the first cylinder. The dashed line indicates the engagement/disengagement flow of the clamping mechanism associated to the second cylinder movement of the piston body of the first cylinder. The x-axis represents time. The timeline of the x-axis corresponds to the timeline of the x-axis of the upper part of the graph illustrating the movement of the piston bodies. The y-axis represents the state of the clamping mechanism, wherein D indicates an engaged state and E indicates a disengaged state.

Generally, the respective clamping mechanism is controlled to engage its associated piston body to the piston rod member in the forward movement and to disengage the respective piston body from the piston rod member in the backward movement. As is illustrated in the lower graphs, both clamping mechanisms are at least partly engaging simultaneously in the overlaps C wherein both piston bodies are moving forward simultaneously. In zones illustrated with the reference F formed within the overlaps C, the clamping mechanism associated to the first piston body initiates disengagement before the corresponding piston body ends the stroke and initiates the retraction movement, but after the second piston body has initiated its stroke. Correspondingly, in zones illustrated with the reference G formed within the overlaps C, the clamping mechanism associated to the second piston body initiates disengagement before the corresponding piston body ends the stroke and initiates the retraction movement, but after the first piston body has initiated its stroke.

The reason for this is that the engagement/disengagement of the clamping mechanisms in practice is not made momentarily. Thus, the engagement/disengagement procedure takes some time. The engagement/disengagement of the clamping mechanism depends for example on the load and/or speed of movement etc. The engagement/disengagement of the clamping mechanism may be in the order of milliseconds.

The engagement/disengagement of the clamping mechanisms provides engagement (clamping/gripping) to securely hold the piston rod member. Accordingly, the clamping mechanism control element may command a valve member to feed fluid with a first fluid pressure to pressure against the piston rod member according to a pre-determined data scheme to obtain the engagement. The engagement/disengagement of the clamping mechanisms provides disengagement (release) to release the piston rod member from the piston body. Accordingly, the control element may command the valve to feed fluid with a second fluid pressure according to a pre-determined data scheme so as to release the engagement from the piston rod member, wherein the second fluid pressure is low enough for said release. Accordingly, a fluid transfer can be used for a clamping action. However, other ways of obtaining the clamping action may be considered.

Figure 8:
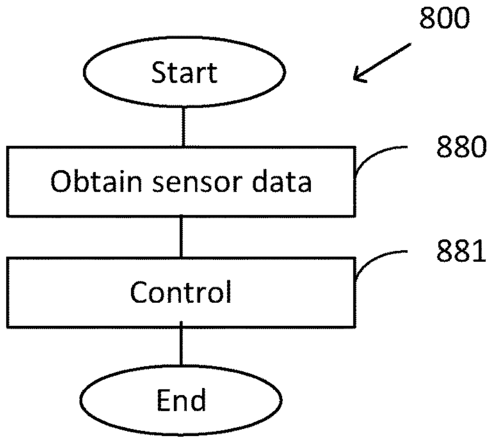
FIG. 8 is a flowchart illustrating an example of a method for control of a fluid actuator arrangement.

In FIG. 8, a method 800 for control of a fluid actuator arrangement is illustrated. In a first step, sensor data related to the position of the respective piston body is obtained.

Thereafter, the respective clamping mechanism and/or the respective back and forward movement is controlled 881 based on the obtained sensor data related to the position of the respective piston body. The sensors may be arranged to sense the position of the respective piston body or clamping mechanism, or both, to obtain the sensor data.

In different embodiments, the step of obtaining 880 sensor data may also comprise obtaining sensor data related to the position and/or the velocity and/or the acceleration of the rod member. The respective clamping mechanism and/or the respective back and forward movement may then be controlled 881 also based on the obtained sensor data related to the position and/or the velocity and/or the acceleration of the rod member.

In different embodiments, the step of obtaining 880 sensor data may also comprise obtaining sensor data related to the pressure of the first and/or second chamber of the first and/or second cylinder and/or a the pressure of a supply to the respective chambers. The respective clamping mechanism and/or the respective back and forward movement may then be controlled 881 based on the obtained sensor data related to pressure of the first and/or second chamber of the first and/or second cylinder and/or a the pressure of a supply to the respective chambers.

FIGS. 11*a*-11*d* illustrate different embodiments of a method of operating an arrangement 1. The method is provided for controlling the motion of a fluid actuator arrangement 1. The fluid actuator arrangement is elongated. The fluid actuator engagement comprises a first cylinder housing 3 encompassing a first piston body 7 comprising a first piston rod engagement and disengagement means 29' and dividing the first cylinder housing 3 in a first and second cylinder chamber 11, 13 coupled to a fluid supply 17 via a valve member means 15, a control unit CPU is associated with a sensor device 201 of the arrangement 1 for determining an actual cylinder-piston feature value and is coupled to said valve member means 15 for regulating fluid flow to said first cylinder housing 3. A piston rod 19 extends through the first piston body 7. The method includes the steps of providing a first actual cylinder-piston feature value to the control unit CPU and furthermore comparing the first actual cylinder-piston feature value with a first desired cylinder-piston feature value. It comprises also the steps of regulating fluid flow to the respective first and second cylinder chamber 11, 13 and repeating the preceding steps until the first actual cylinder-piston feature value corresponds with the first desired cylinder-piston feature value. The arrangement 1 further comprises a second cylinder housing 5 encompassing a second piston body 9 comprising a second piston rod engagement and disengagement means 29" and dividing the second cylinder housing 5 in a first and second cylinder chamber 11, 13 coupled to said fluid supply 17 via the valve member means 15. The control unit CPU is associated with a further sensor device 201 (linear potentiometer attached to the second cylinder housing 5) for determining an actual cylinder-piston feature value and is coupled to said valve member means 15 for regulating fluid flow to said second cylinder housing 5. The method includes pressurizing the first cylinder chamber 11 of the first cylinder housing 3 with a first fluid pressure feature for engaging the first piston rod engagement and disengagement means 29' to the piston rod 19 and driving the first piston body 7 with the piston rod 19 from a first start position (S1, see FIG. 12) to a first end position E1 (See FIG. 12). The method further comprises the steps of pressurizing the second cylinder chamber 13 of the second cylinder housing 5 with a second fluid pressure feature for disengaging the second piston rod engagement and disengagement means 29" from the piston rod 19 and retracting the second piston body 9 to a second start position S2 (see FIG. 12) and pressurizing the first cylinder chamber 11 of the second cylinder housing 5 with the first fluid pressure feature for engaging the second piston rod engagement and disengagement means 29" to the piston rod 19 and driving the second piston body 9 with the piston rod 19 from the second start position S2 to a second end position E2 (see FIG. 12). The valve member means 15 is controlled to manage the second start position S2 to precede said first end position E1 with an overlap time interval.

Figure 11A:
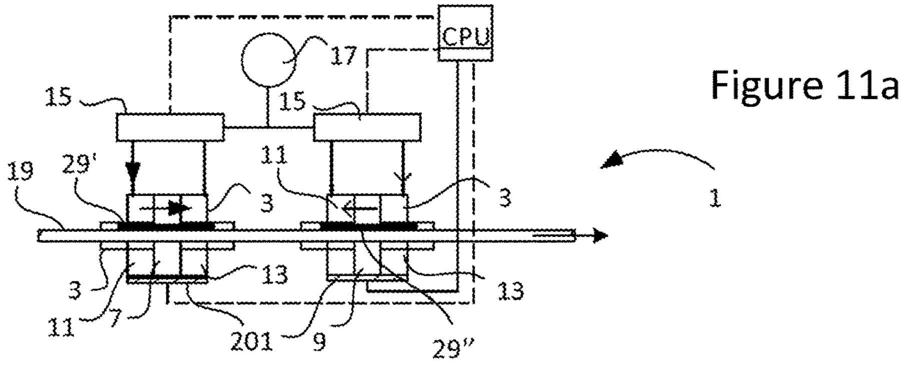
FIGS. 11*a*-11*b* illustrates examples of how the different embodiments of a fluid actuator arrangement may be constituted.

In FIG. 11*a* the first piston body 7 propels the piston rod 19 at the same time as the second piston body 9 is retracted. The motion and rates of the respective piston body being controlled by the control unit CPU.

Figure 11B:
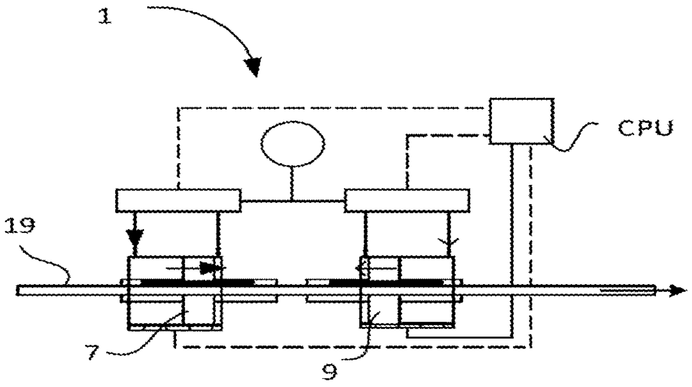

In FIG. 11*b* the first piston body 7 reaches the first end position and the second piston body 9 reaches the second start position.

Figure 11C:
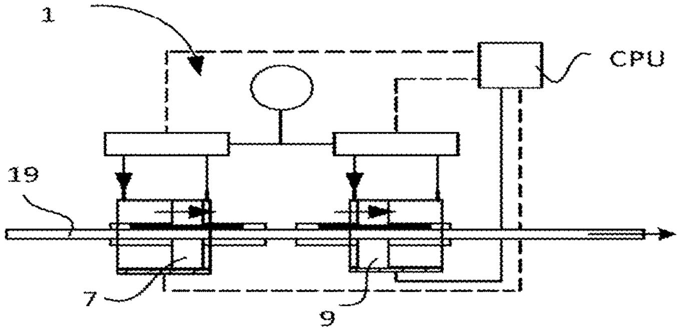

In FIG. 11*c* is shown the position wherein the piston bodies 7, 9 drive the piston rod in said overlap time interval for achieving smooth performance of the arrangement 1.

Figure 11D:
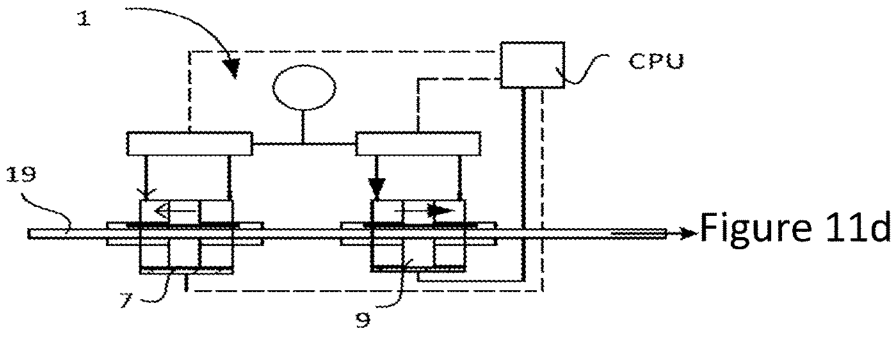

In FIG. 11*d* is shown that the second piston body 9 propels the piston rod 19 at the same time as the first piston body 7 is retracted. The motion and rates of the respective piston body being controlled by the control unit CPU.

Figure 12:
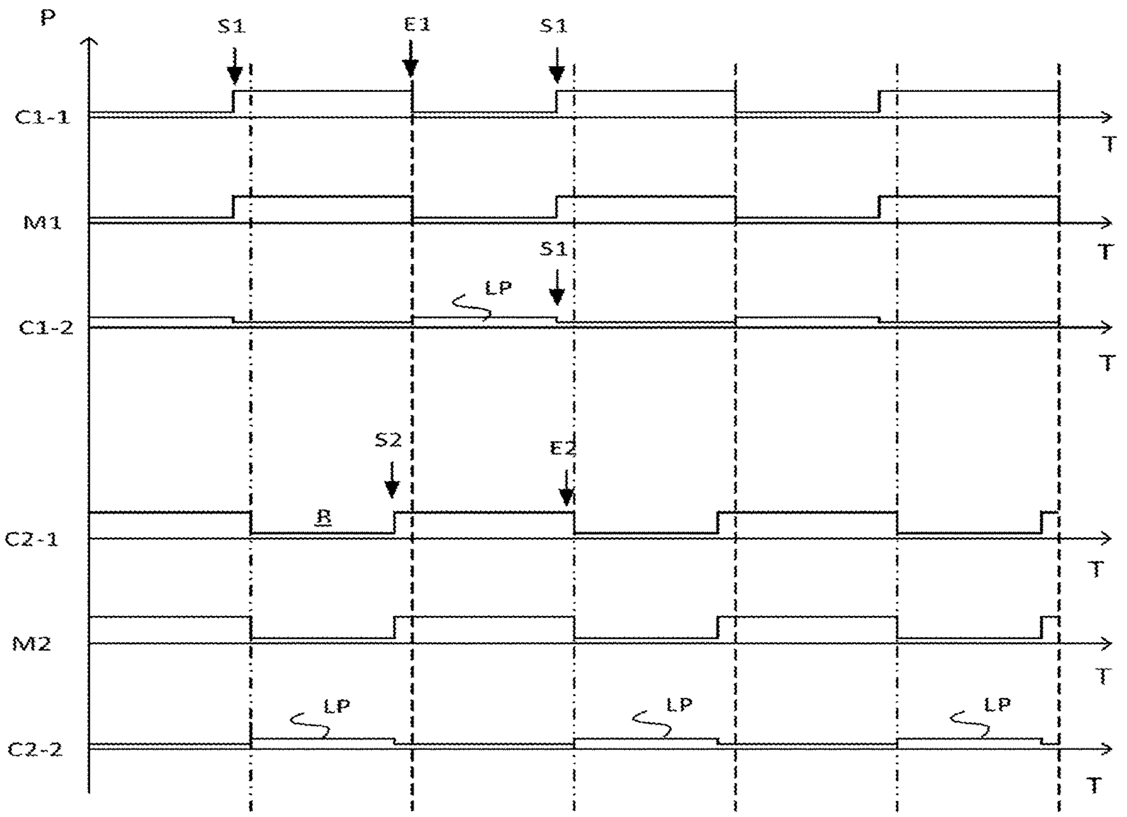
FIG. 12 is a graph schematically illustrating an operational flow of different embodiment s of fluid actuator arrangements.

FIG. 12 illustrates schematic actuation scheme of actuators as an example. P marks fluid pressure applied to the first C1-1 and the second C1-2 cylinder chamber of the first cylinder housing and also the pressure applied to the engagement and disengagement means of the first piston body of the first cylinder housing by controlling the valve member means (e.g. reference 15) by means of commands from the control unit CPU in regards from signals fed from sensors mounted to the cylinder housings. The levels of the pressure may fluctuate due to various loads on the piston rod etc. T marks time. The first cylinder chamber C1-1 of the first cylinder housing is pressurized as well as the engagement and disengagement means of the first piston body for clamping action and driving of the first piston body (with the piston rod) from a first start position S1 to a first end position E1. Thereafter, the second cylinder chamber C1-2 of the first cylinder housing is pressurized with a lower pressure LP for retraction of the piston body back to the first start position S1, wherein the engagement and disengagement means being controlled during said retraction to disengage the first piston body from the piston rod. During propulsion of the first piston body from the first start position S1 to the first end position E1, the second piston body of the second cylinder housing is retracted R. The time for retraction of the second piston body is shorter than the time for the working stroke of the first piston body from the first start position S1 to the first end position E1. The second start position S2 of the second piston body precedes the first end position of the working stroke of the first piston body. The working stroke of the second piston body prevails from the second starting position S2 to the second end position E2. In the same way, subsequently, the first start position S1 of first piston body precedes the second end position E2 of the working stroke of the second piston body for providing an overlap time interval. The time for retraction of the first piston body is shorter than the time for the working stroke of the second piston body from the second start position S2 to the second end position E2.

The present invention is of course not in any way restricted to the preferred embodiments described above, but many possibilities to modifications, or combinations of the described embodiments, thereof should be apparent to a person with ordinary skill in the art without departing from the basic idea of the invention as defined in the appended claims. The valve member means may comprise a logic valve of suitable type. The valve member means may comprise a 5 ports/2 valve positions unit, so called 5/2 valve or others. The valve member means may comprise a two-way valve of any type suitable for the arrangement. The valve member means may be comprise any valve suitable for fulfilling the functionality of pressurizing the piston rod engagement and disengagement means in view of pressurizing one cylinder chamber at the time. The manoeuvring of the valve member may be performed by means of a solenoid connected to a control unit adapted for controlling the valve member and thereby the arrangement. The arrangement may be adapted for fast and high clamp force engagement of the piston device for propelling the latter accurate also for acceleration of heavy loads.

The fluid can be hydraulic oil, gas or other.

The invention may belong to any of the segments aircraft industry, construction industry, jacking systems for oil well drilling and service platforms, agricultural equipment industry, marine industry, crane manufacture industry.

The invention claimed is:

1. A fluid actuator arrangement comprising:

a piston rod member, at least two cylinders each said cylinder having a piston body dividing an interior of the respective cylinder in a first and a second cylinder chamber, a clamping mechanism associated to each cylinder, each of said clamping mechanisms being arranged to engage the respective piston body of the cylinder to the piston rod member in a forward movement of the piston body to allow driving the piston rod member, and to disengage the piston body of the cylinder from the piston rod member in a backward movement of the piston body to allow sliding of the piston body in relation to the piston rod member, a control element comprising:

a piston body movement control element arranged to control a back and forward movement of the respective piston body so that forward movement is slower than the backward movement and to control the forward and the backward movement of the respective piston bodies in relation to each other such that at least one piston body is always moving forward and such that an overlap exists wherein at least two of the piston bodies are moving forward simultaneously during a cycle, and a clamping mechanism control element arranged to control the respective clamping mechanism to engage the piston body to the piston rod member in the forward movement and to disengage the piston body from the piston rod member in the backward movement, and a sensor arrangement arranged to obtain position information related to a position of the piston body within the respective cylinder, wherein the fluid actuator arrangement is further arranged to continuously obtain sensor data related to the position and the velocity and the acceleration of the rod member, wherein the respective clamping mechanism and the respective back and forward movement is controlled based on the obtained sensor data related to the position and the velocity and the acceleration of the rod member, wherein the piston body movement control element is arranged to compare the obtained position information with a desired position of the respective piston body and to force the respective piston body to the desired position based on said comparison, thereby achieving synchronisation between the operations of the cylinders, wherein the control element is arranged to activate a safety mode at least one of upon detection of a deviation from a normal behavior of the fluid actuator arrangement and upon detection of activation of an emergency brake, and wherein each of said clamping mechanisms is configured to engage the respective piston body to drive the piston rod member and is configured, in the safety mode, to clamp around the piston rod member to secure that the piston rod member is held in a fixed position.

2. The fluid actuator arrangement according to claim 1, further comprising said emergency brake.

3. The fluid actuator arrangement according to claim 1, wherein in the safety mode, operation of the fluid actuator arrangement is stopped.

4. The fluid actuator arrangement according to claim 1, further comprising:

a non-return valve arranged between at least one of the clamping mechanisms and a pressure supply arranged to power the clamping mechanism and an accumulator arranged to power at least one of the clamping mechanisms in the safety mode.

5. The fluid actuator arrangement according to claim 1, further comprising a stationary clamping mechanism arranged along an extension of the piston rod member and adapted to clamp around the piston rod member in the safety mode.

6. The fluid actuator arrangement according to claim 1, wherein in the safety mode, an alarm is presented to an operator.

7. The fluid actuator arrangement according to claim 1, wherein the clamping mechanism control element is arranged to control the respective clamping mechanism based on the obtained position information related to the piston body within the cylinder.

8. The fluid actuator arrangement according to claim 7, wherein the sensor arrangement comprises at least one sensor mounted within the cylinder.

9. The fluid actuator arrangement according to claim 7, wherein the sensor arrangement arranged to obtain the position information related to the position of the piston body within the respective cylinder comprises at least one position and/or presence sensor arranged to sense the position/presence of the clamping mechanism and in that the control element is arranged to the determine the position of the piston body within the cylinder based on the sensed position/presence of the clamping mechanism.

10. The fluid actuator arrangement according to claim 7, wherein the sensor arrangement arranged to obtain the position information related to the position of the piston body comprises a continuous position sensor arranged to continuously obtain the position information related to the position of the piston body.

11. The fluid actuator arrangement according to claim 7, wherein:

the sensor arrangement is arranged to obtain first position information indicating that the piston body passes a first position along its stroke, wherein the clamping mechanism control element is arranged to control the respective clamping mechanism and/or the piston body control element is arranged to control the back and forward movement of the respective piston body based on the obtained first position information, and the sensor arrangement is arranged to obtain second position information indicating that the piston body passes a second position along its stroke, wherein the clamping mechanism control element is arranged to control the respective clamping mechanism and/or the piston body control element is arranged to control the back and forward movement of the respective piston body based on the obtained second position information.

12. The fluid actuator arrangement according to claim 7, wherein the sensor arrangement is arranged to obtain third position information indicating that the piston body reaches an end of a stroke, wherein the clamping mechanism control element is arranged to control the respective clamping mechanism and/or the piston body control element is arranged to control the back and forward movement of the respective piston body based on the obtained third position information.

13. The fluid actuator arrangement according to claim 7, further comprising a counter arranged determine a timing of an end of a stroke, wherein the clamping mechanism control element is arranged to control the respective clamping mechanism and/or the piston body control element is arranged to control the back and forward movement of the respective piston body based on the determined timing of the end of the stroke.

14. The fluid actuator arrangement according to claim 7, wherein the control element further is arranged to monitor the obtained position information related to the position of the piston body and to activate the safety mode when the obtained position information related to the position of the piston body deviates from an expected behavior.

15. The fluid actuator arrangement according claim 1, wherein the sensor arrangement comprises at least one position and/or presence sensor arranged to obtain the position information related to the position of the piston body within the cylinder.

16. The fluid actuator arrangement according to claim 1, further comprising a piston rod member sensor arrangement arranged to obtain information related to the piston rod member.

17. The fluid actuator arrangement according to claim 16, wherein the clamping mechanism control element is arranged to control the respective clamping mechanism and/or the piston body control element is arranged to control the back and forward movement of the respective piston body based on the information from the piston rod member sensor arrangement.

18. The fluid actuator arrangement according to claim 16, wherein the control element is arranged to activate the safety mode based on the information from the piston rod member sensor arrangement.

19. The fluid actuator arrangement according to claim 16, wherein the piston rod sensor arrangement is arranged to obtain information related to the position and/or the velocity and/or the acceleration of the piston rod member.

20. The fluid actuator arrangement according to claim 16, wherein the piston rod sensor arrangement comprises a potentiometer and/or a linear variable differential transformer, LVDT, and/or a resolver and/or an optic sensor and/or a magnetic sensor and/or an accelerometer.

21. The fluid actuator arrangement according to claim 16, wherein the control element is arranged to tune an algorithm for control of the back and forward movement of the respective piston body and/or to tune art algorithm, for the control of the engagement and disengagement of the respective piston body based on the obtained information related to the piston rod member.

22. The fluid actuator arrangement according to claim 1, further comprising a pressure sensor arrangement arranged to obtain pressure information related to a pressure in the respective first or second cylinder chamber or in a supply.

23. The fluid actuator arrangement according to claim 22, wherein the control element is arranged to determine which piston body carries the load based on the obtained pressure information.

24. The fluid actuator arrangement according to claim 1, wherein the at least two cylinders are arranged along an extension of the piston rod member so that the piston rod member extends through the respective piston body.

25. The fluid actuator arrangement according to claim 1, further comprising a transfer element arranged to transfer the movement from the respective piston body to the associated clamping mechanism.

26. The fluid actuator arrangement according to claim 1, wherein the at least two cylinders are arranged at a radial distance from the piston rod member.

27. A control element for control of an elongated fluid actuator arrangement comprising a piston rod member, at least two cylinders, each cylinder having a piston body dividing an interior of the respective cylinder in a first and a second cylinder chamber, a clamping mechanism associated to each cylinder, each of said clamping mechanisms being arranged to engage the piston body of the cylinder to the piston rod member in a forward movement of the piston body to drive the piston rod member, and to disengage the piston body of the cylinder from the piston rod member in a backward movement of the piston body to allow sliding of the piston body in relation to the piston rod member, wherein the control element further comprises:

a piston body movement control element arranged to control a back and forward movement of the respective piston body so that forward movement is slower than the backward movement and to control the movement of the respective piston bodies in relation to each other such that at least one piston body is always moving forward and such that an overlap exists wherein at least two of the piston bodies are moving forward simultaneously during a cycle; and a clamping mechanism control element arranged to control the respective clamping mechanism to engage the piston body to the piston rod member in the forward movement and to disengage the piston body from the piston rod member in the backward movement; and a sensor arrangement arranged to obtain position information related to a position of the piston body within the respective cylinder, wherein the elongated fluid actuator arrangement is further arranged to continuously obtain sensor data related to the position and the velocity and the acceleration of the rod member, wherein the respective clamping mechanism and/or the respective back and forward movement is controlled based on the obtained sensor data related to the position and the velocity and the acceleration of the rod member, wherein the piston body movement control element is arranged to compare obtained position information with a desired position of the respective piston body and to force the respective piston body to the desired position based on said comparison, thereby, achieving synchronisation between the operations of the cylinders, wherein the control element is arranged to activate a safety mode at least one of upon detection of a deviation from a normal behavior of the fluid actuator arrangement and upon detection of activation of an emergency brake, and wherein each of said clamping mechanisms is configured to engage the respective piston body to drive the piston rod member and is configured, in the safety mode, to clamp around the piston rod member to secure that the piston rod member is held in a fixed position.

28. A method for control of an elongated fluid actuator arrangement comprising a piston rod member, at least two cylinders each said cylinder having a piston body dividing an interior of the respective cylinder in a first and a second cylinder chamber, a clamping mechanism associated to each cylinder, each of said clamping mechanisms being arranged to engage the respective piston body of the cylinder to the piston rod member in a forward movement of the piston body to drive the piston rod member, and to disengage the piston body of the cylinder from the piston rod member in a backward movement of the piston body to allow sliding of the piston body in relation to the piston rod member, wherein the method comprises:

obtaining sensor data related to the position of the respective piston body;

controlling a back and forward movement of the respective piston body so that forward movement is slower than the backward movement and so that at least one piston body is always moving forward and such that for each cycle an overlap exists, wherein at least two of the piston bodies are moving forward simultaneously, based on the obtained sensor data related to the position of the respective piston body, controlling the respective clamping mechanism to engage its associated piston body to the piston rod member in the forward movement and to disengage the respective piston body from the piston rod member in the backward movement, wherein the elongated fluid actuator arrangement is further arranged to continuously obtain sensor data related to the position and the velocity and the acceleration of the rod member, wherein the respective clamping mechanism and/or the respective back and forward movement is controlled based on the obtained sensor data related to the position and the velocity and the acceleration of the rod member, wherein the controlling of the position of the respective piston body comprises comparing the obtained sensor data related to the position of the respective piston body with a desired position of the respective piston body and to force the respective piston body to the desired position based on said comparison, thereby achieving synchronisation between the operations of the cylinders, wherein the control element is arranged to activate a safety mode at least one of upon detection of a deviation from a normal behavior of the fluid actuator arrangement and upon detection of activation of an emergency brake, and wherein each of said clamping mechanisms is configured to engage the respective piston body to drive the piston rod member and is configured, in the safety mode, to clamp around the piston rod member to secure that the piston rod member is held in a fixed position.

29. The method for control of the elongated fluid actuator arrangement according to claim 28, wherein the respective clamping mechanism is controlled based on the obtained sensor data related to the position of the respective piston body.

30. The method for control of the elongated fluid actuator arrangement according to claim 28, comprising obtaining sensor data related to the pressure of the first and/or second chamber of the first and/or second cylinder and/or a the pressure of a supply to the respective chambers, wherein the respective clamping mechanism and/or the respective back and forward movement is controlled based on the obtained sensor data related to pressure of the first and/or second chamber of the first and/or second cylinder and/or a the pressure of a supply to the respective chambers.

31. A non-transitory computer-readable storage medium storing one or more instructions which, when executed by one or more processors of the elongated fluid actuator arrangement, the one or more instructions for performing the method for control of an elongated fluid actuator arrangement according to claim 28.

* * * * *